(12) United States Patent
Hori et al.

(10) Patent No.: US 12,184,112 B2
(45) Date of Patent: Dec. 31, 2024

(54) BATTERY PACK INCLUDING FUNCTION TO STOP CHARGING IN RESPONSE TO FIRST OR SECOND CONDITION

(71) Applicant: MAKITA CORPORATION, Anjo (JP)

(72) Inventors: Tomoki Hori, Anjo (JP); Hayato Kano, Anjo (JP)

(73) Assignee: MAKITA CORPORATION, Anjo (JP)

( * ) Notice: Subject to any disclaimer, the term of this patent is extended or adjusted under 35 U.S.C. 154(b) by 539 days.

(21) Appl. No.: 17/547,882

(22) Filed: Dec. 10, 2021

(65) Prior Publication Data
US 2022/0190620 A1 Jun. 16, 2022

(30) Foreign Application Priority Data
Dec. 16, 2020 (JP) ................................ 2020-208636

(51) Int. Cl.
| | |
|---|---|
| *H02J 7/00* | (2006.01) |
| *H01M 10/42* | (2006.01) |
| *H01M 10/44* | (2006.01) |
| *H01M 10/46* | (2006.01) |
| *H01M 10/48* | (2006.01) |

(52) U.S. Cl.
CPC ....... *H02J 7/00714* (2020.01); *H01M 10/425* (2013.01); *H01M 10/443* (2013.01); *H01M 10/46* (2013.01); *H01M 10/486* (2013.01); *H02J 7/00036* (2020.01); *H02J 7/005* (2020.01); *H02J 7/007182* (2020.01); *H02J 7/007194* (2020.01); *H01M 2010/4271* (2013.01)

(58) Field of Classification Search
CPC .... H02J 7/00714; H02J 7/00036; H02J 7/005; H02J 7/007182; H02J 7/007194; H01M 10/425; H01M 10/443; H01M 10/46; H01M 10/486; H01M 2010/4271
USPC .................................................. 320/162, 164
See application file for complete search history.

(56) References Cited

U.S. PATENT DOCUMENTS

| | | | | |
|---|---|---|---|---|
| 5,869,949 A | * | 2/1999 | Nishikawa | H02J 7/00047 |
| | | | | 320/101 |
| 2014/0247005 A1 | * | 9/2014 | Graham | H02J 7/342 |
| | | | | 320/162 |
| 2017/0366023 A1 | * | 12/2017 | Tanaka | H01M 10/425 |

(Continued)

FOREIGN PATENT DOCUMENTS

| | | | | | |
|---|---|---|---|---|---|
| CN | 112467816 A | * | 3/2021 | | H01M 10/425 |
| EP | 3474413 A1 | * | 4/2019 | | H01M 10/443 |
| JP | 2006129540 A | * | 5/2006 | | |

(Continued)

*Primary Examiner* — Richard Isla
*Assistant Examiner* — Manuel Hernandez
(74) *Attorney, Agent, or Firm* — Oliff PLC

(57) ABSTRACT

A battery pack includes an attaching portion, a battery, a voltage detection circuit, a current acquisition circuit, a next current calculation circuit, a first charging stop circuit, and a second charging stop circuit. The attaching portion is electrically and mechanically connected to the battery charger. The first charging stop circuit stops charging of the battery in response to a first condition being satisfied. The second charging stop circuit stops the charging of the battery in response to a second condition different from the first condition being satisfied.

11 Claims, 8 Drawing Sheets

(56) References Cited

U.S. PATENT DOCUMENTS

2019/0123569 A1 4/2019 Kobayakawa et al.

FOREIGN PATENT DOCUMENTS

| JP | 2019-080406 A | | 5/2019 | |
|----|---------------|---|--------|---|
| JP | 2019075955 A | * | 5/2019 | |
| JP | 2019080407 A | * | 5/2019 | |
| WO | WO-2013008396 A1 | * | 1/2013 | .......... H01M 10/443 |

* cited by examiner

| Vtg | ~T1°C | T1°C~T2°C | T2°C~ |
|---|---|---|---|
| DEGREE OF DETERIORATION 0 | 4.05V | 4.15V | 4.10V |
| DEGREE OF DETERIORATION 1 | 4.00V | 4.10V | 4.05V |

FIG. 8

BATTERY PACK INCLUDING FUNCTION TO STOP CHARGING IN RESPONSE TO FIRST OR SECOND CONDITION

CROSS-REFERENCE TO RELATED APPLICATIONS

The present application claims the benefit of Japanese patent application No. 2020-208636 filed with the Japan Patent Office on Dec. 16, 2020 and the entire disclosure of which is incorporated herein by reference.

BACKGROUND

The present disclosure relates to a rechargeable battery pack.

JP 2019-80406A discloses a relatively large, high speed (or high rate) battery charger.

SUMMARY

With such a high speed (or a high rate) battery charger described above, a charge time of a battery pack is shortened. However, some users desire an inexpensive charger and accept a longer charge time. In an inexpensive battery charger, it is necessary to use inexpensive parts with low heat resistance in the battery charger. Since an inexpensive battery charger uses a small charging current, the inexpensive battery charger charges a battery pack at a low speed (or at a low rate). If such a low speed battery charger is used to charge a battery pack, a voltage drop by the internal resistance of the battery pack becomes smaller than a case where the battery pack is charged with a high speed battery charger. Therefore, in order to charge a battery pack to a predetermined level with a low speed battery charger, the battery pack requires a charging control different from that of a high speed battery charger.

In one aspect of the present disclosure, it is desirable to provide a battery pack applicable for chargers having different charging speeds.

A battery pack according to one aspect of the present disclosure includes an attaching portion, a battery, a voltage detection circuit, a current acquisition circuit, a next current calculation circuit, a first charging stop circuit and a second charging stop circuit. The attaching portion is electrically and mechanically connected to a battery charger. The battery is electrically connected to the attaching portion. The voltage detection circuit detects a voltage value of the battery. The current acquisition circuit obtains a charging current value. The charging current value corresponds to an amount of charging current flowing from the battery charger to the battery in a present processing cycle. The next current calculation circuit calculates a next current value based on the charging current value obtained by the current acquisition circuit. The next current value corresponds to an allowable value of a charging current value in a next processing cycle. The first charging stop circuit stops a charging of the battery in response that (i) the charging current value obtained by the current acquisition circuit is equal to or more than a completion current value that is set and (ii) a first condition is satisfied. The first condition is satisfied in response to (i) the voltage value detected by the voltage detection circuit being equal to or more than a completion voltage value that is set, and (ii) the next current value calculated by the next current calculation circuit being less than the completion current value. The second charging stop circuit stops the charging of the battery in response that (i) the charging current value obtained by the current acquisition circuit is less than the completion current value that (ii) a second condition different from the first condition is satisfied. A battery pack according to another aspect of the present disclosure may remove at least one of the attaching portion, the battery, the voltage detection circuit, the current acquisition circuit, the next current calculation circuit, the first charging stop circuit and the second charging stop circuit.

The battery pack according to one aspect of the present disclosure stops charging in response that (i) the charging current value is equal to or more than the completion current value and (ii) the first condition is satisfied. Also, the battery pack stops charging in response that (i) the charging current value is less than the completion current value and (ii) the second condition different from the first condition is satisfied. That is, when a battery is charged with a relatively small charging current, a charging control different from the one used when the battery is charged with a relatively large charging current is executed. Therefore, a battery pack applicable for multiple battery chargers having different charging speeds can be realized.

The above battery pack may further include a target voltage setting circuit. The target voltage setting circuit may set a target voltage value. The target voltage value may correspond to an open circuit voltage value of the battery when the charging of the battery is stopped by the first charging stop part. The second condition may correspond to a condition that an open circuit voltage value of the battery when the charging is stopped by the second charging stop circuit is matched to the target voltage value.

When a battery is charged with a relatively small charging current, an amount of voltage drop due to the internal resistance of the battery is small compared to a case where the battery is charged with a relatively large charging current. Thus, if a completion voltage value in the case of charging the battery with a relatively small charging current is the same as a completion voltage value in the case of charging the battery with a relatively large charging current, an open circuit voltage value when the charging is stopped becomes larger than the target voltage value. That is, the charging capacity of the battery increases. The completion voltage value is a closed circuit voltage value just before the charging is stopped. Thus, as the target voltage value, an open circuit voltage value when the battery is charged with a relatively large charging current and the charging is stopped is calculated. If the battery is charged with a relatively small charging current, the second condition is set so that the open circuit voltage value when the charging is stopped is matched to the target voltage value. This allows the open circuit voltage value on completion of the charging of the battery with the relatively small charging current to be matched to the open circuit voltage value on completion of the charging of the battery with the relatively large charging current.

The above-described battery pack may further include a temperature detection circuit. The temperature detection circuit may detect a temperature of the battery. The target voltage calculation circuit may calculate a target voltage value based on a temperature detected by the temperature detection circuit and/or a degree of deterioration of the battery.

The target voltage value is calculated based on the temperature and/or the degree of deterioration of the battery, which can inhibit the overcharge of the battery and can suitably protect the battery.

The above-described battery pack may further include a memory. The memory may store a correlation (or correspondence) data of the temperature and/or the degree of deterioration of the battery and the target voltage value. The target voltage setting circuit may set the target voltage value based on the correlation data stored in the memory.

It is possible to set the target voltage value for the battery pack in accordance with the temperature and/or the degree of deterioration of the battery.

The above-described battery pack may further include a determination value calculation circuit. The determination value calculation circuit calculates a determination value by adding a correction value to the target voltage value. The correction value may correspond to (Vset−Vtg)×Inow/Icut. Vset may represent the completion voltage value. Vtg may represent the target voltage value. Inow may represent the charging current value obtained by the current acquisition circuit. Icut may represent the completion current value. The second condition may be satisfied in response that the voltage value detected by the voltage detection circuit is equal to or more than the determination value calculated by the determination value calculation circuit.

The amount of voltage drop in the present charging current value is calculated as the correction value, and the value obtained by adding the calculated correction value to the target voltage value is calculated as the determination value. This allows the open circuit voltage value when the charging is completed in response to the second condition being satisfied to be matched to the target voltage value.

The above-described battery pack may further include a completion current setting circuit. The completion current setting circuit may set a completion current value based on the temperature detected by the temperature detection circuit and/or the degree of deterioration of the battery.

It is possible to set the completion current value for the battery pack in accordance with the temperature and/or the degree of deterioration of the battery.

The above-described battery pack may further include a completion voltage setting circuit. The completion voltage setting circuit may set a completion voltage value based on the temperature detected by a temperature detection circuit and/or the degree of deterioration of the battery.

It is possible to set the completion voltage value for the battery pack in accordance with the temperature and/or the degree of deterioration of the battery.

The above-described battery pack may further include a communication circuit. The communication circuit may communicate with the battery charger. The current acquisition circuit may obtain the charging current value from the battery charger through the communication circuit.

The battery pack can obtain the charging current value from the battery charger.

The next current calculation circuit may transmit the calculated next current value to the battery charger through the communication circuit.

With the battery pack transmitting the next current value to the battery charger, the battery charger can supply a charging current in accordance with the state of the battery pack to the battery pack.

A method for controlling a charging of a battery electrically connected to a battery charger according to another aspect of the present disclosure includes:
  detecting a voltage value of the battery;
  obtaining a charging current value, the charging current value corresponding to an amount of a charging current flowing from the battery charger to the battery in a present processing cycle;
  calculating a next current value based on the charging current value obtained, the next current value corresponding to an allowable value of the charging current value in a next processing cycle,
  stopping a charging of the battery in response to (i) the charging current value obtained being equal to or more than the completion current value that is set and (ii) a first condition being satisfied, the first condition being satisfied in response to (i) the voltage value detected being equal to or more than a completion voltage value that is set, and (ii) the next current value calculated being less than the completion current value; and
  stopping the charging of the battery in response to (i) the charging current value obtained being less than the completion current value that is set and (ii) a second condition different from the first condition being satisfied.

Execution of the above-described charging control method exhibits effects similar to those exhibited by the above-described battery pack.

A charging system according another aspect of the present disclosure may be item 1 and item2 described below.

[Item 1]
A charging system including:
  a battery pack including a lithium-ion battery;
  a high-speed charger configured to be connected to the battery pack; and
  a low-speed charger configured to be connected to the battery pack,
  a maximum current value that the high-speed charger can output being equal to or more than a completion current value,
  a maximum current value that the low-speed charger can output being less than the completion current value, and
  the completion current value corresponding to a charging current value on completion of a charging of the lithium-ion battery with a constant current constant voltage charging.

According to the charging system in another aspect of the present disclosure, the battery pack can be attached to the high-speed charger and the low-speed charger, and both of the high-speed charger and the low-speed charger can be used to charge the battery pack.

[Item 2]
The charging system according to item 1, wherein
the battery pack includes:
  a required current calculation circuit configured to calculate a required current value based on a state of the battery; and
  a request output circuit configured to output the required current value calculated by the required current calculation circuit to the high-speed charger or the low-speed charger connected to the battery pack, and
wherein the high-speed charger and the low-speed charger includes:
  an upper limit current calculation circuit configured to calculate an upper limit current value based on a state of battery charger; and
  a current output circuit outputting an electric current having the upper limit current value calculated by the upper limit current calculation circuit or the required current value outputted from the battery pack, whichever is smaller.

The high-speed charger and the low-speed charger output the electric current having the upper limit current value or the required current value whichever is smaller, which inhibits the overheat of the battery charger and the overcharge of the battery pack, resulting in the protection of both the battery charger and the battery pack.

According to the battery pack of the charging system in another aspect of the present disclosure, the required current calculation circuit or the request output circuit may be removed. According to the high-speed charger of the charging system in another aspect of the present disclosure, the upper limit current calculation circuit or the current output circuit may be removed. According to the low-speed charger of the charging system in another aspect of the present disclosure, the upper limit current calculation circuit or the current output circuit may be removed.

BRIEF DESCRIPTION OF THE DRAWINGS

Some example embodiments of the present disclosure will be described hereinafter by way of example with reference to the accompanying drawings, in which:

FIG. 8 is a table of target voltage values associated with battery temperatures and degrees of deterioration.

DETAILED DESCRIPTION OF EXEMPLARY EMBODIMENTS

1. Configuration

<1-1. System Configuration>

Figure 1:
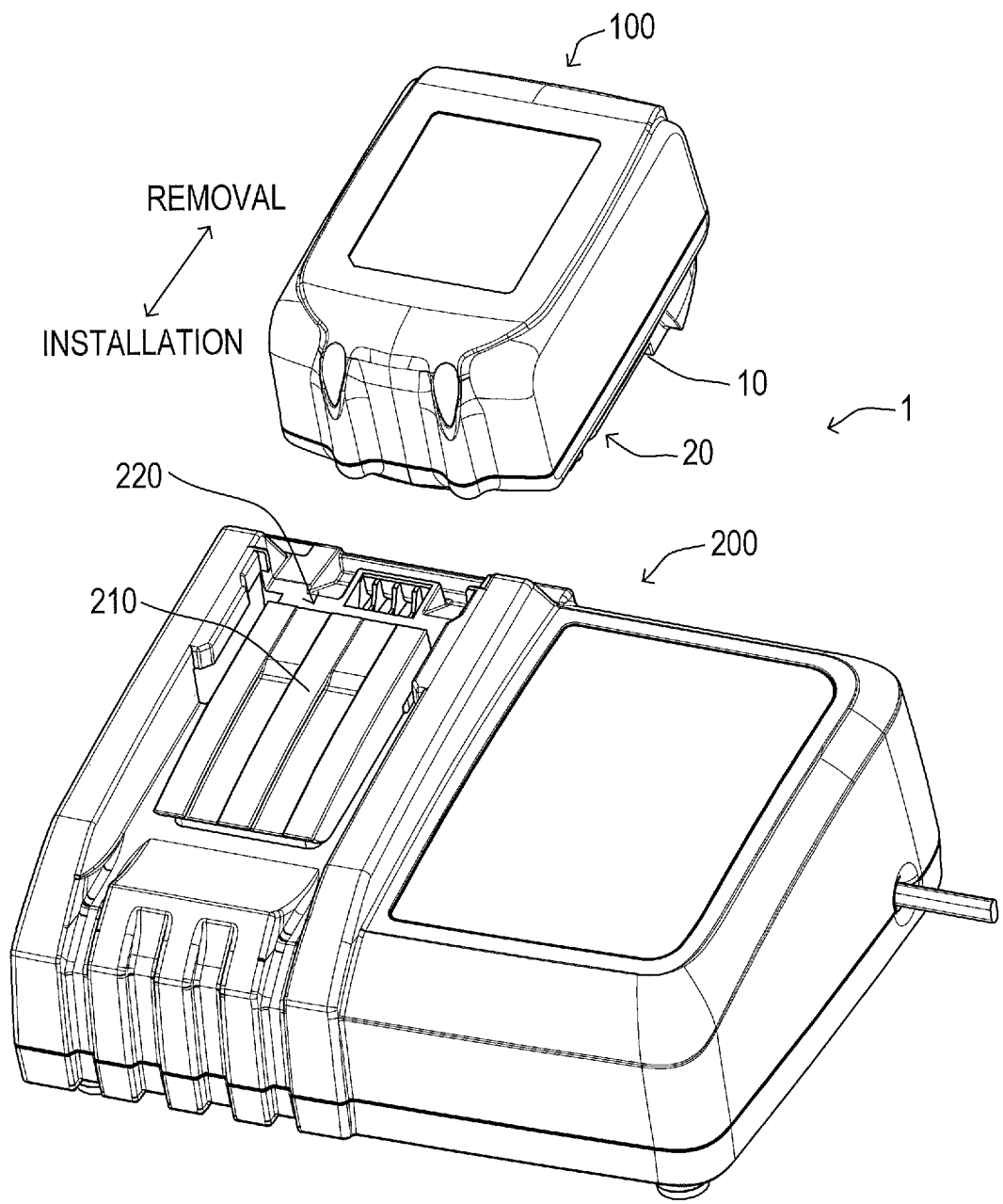
FIG. 1 shows a battery pack and a high rate battery charger according to a recharging system of the present embodiment.
Figure 2:
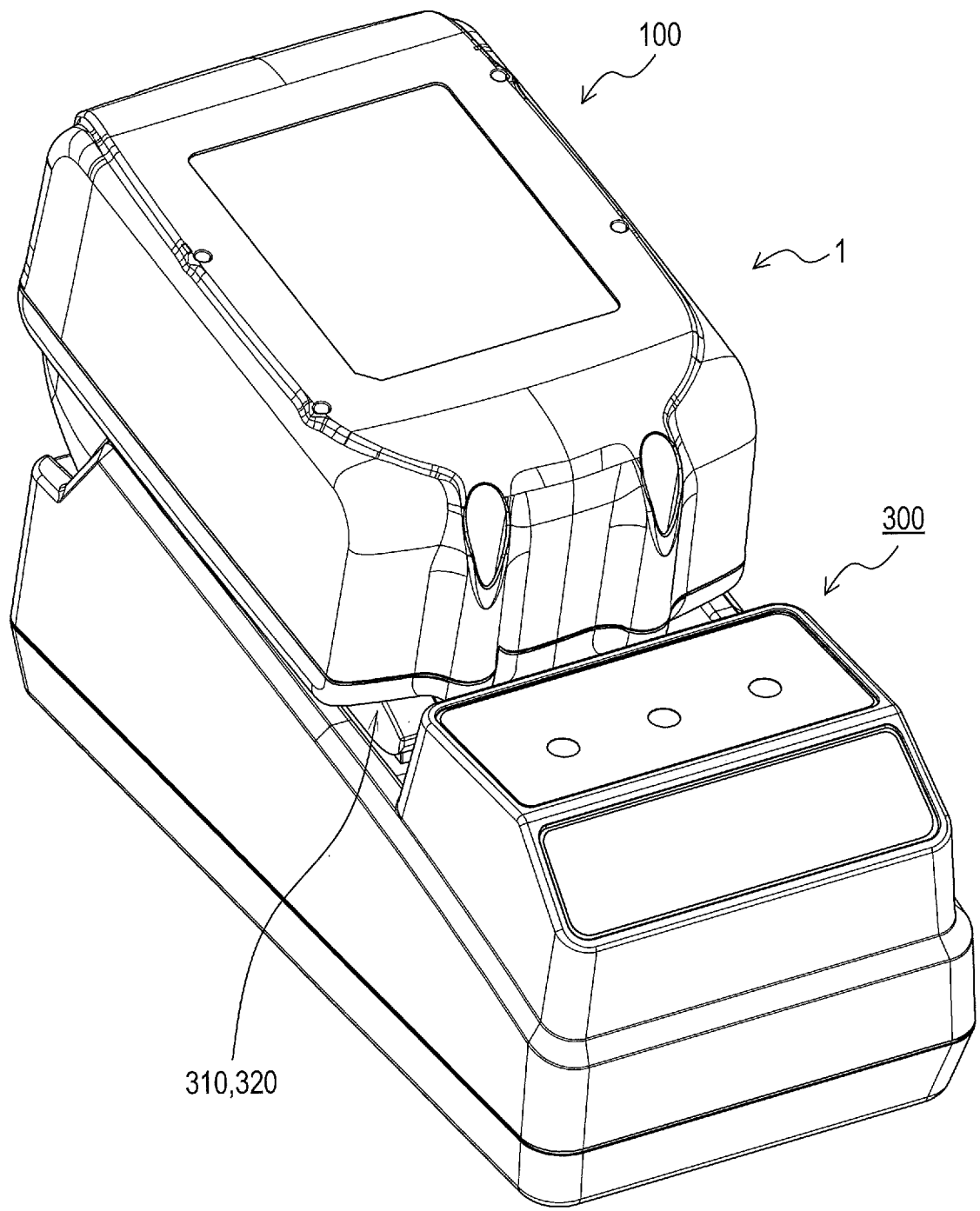
FIG. 2 shows the battery pack and a low rate battery charger according to the recharging system of the present embodiment.

With reference to FIGS. 1 and 2, a charging system 1 of the present embodiment will be described.

The charging system 1 of the present embodiment includes a battery pack 100, a high rate battery charger 200, and a low rate battery charger 300. The charging system 1 may remove any of the battery pack 100, the high rate battery charger 200, and the low rate battery charger 300.

Figure 3:
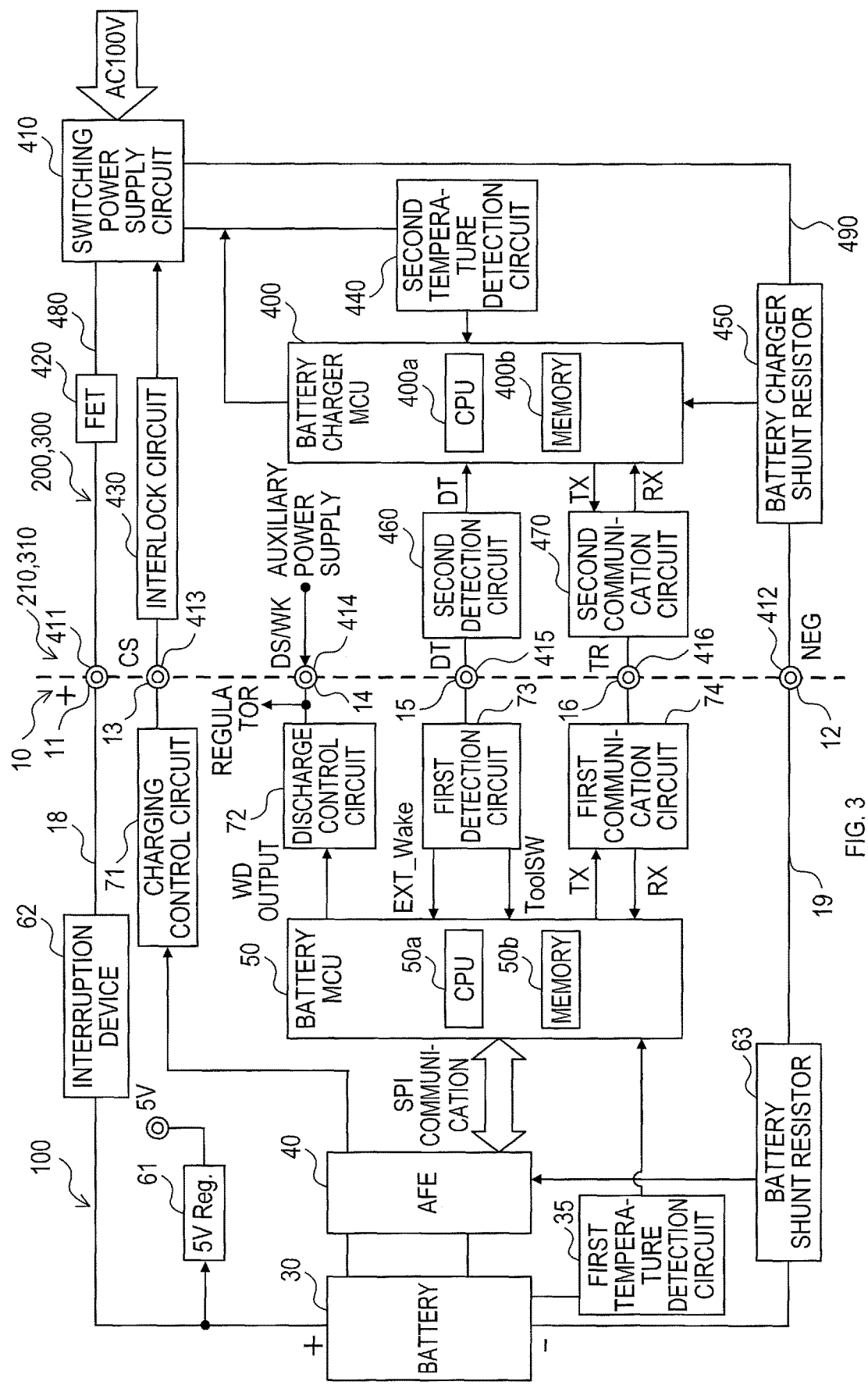
FIG. 3 is a block diagram showing an electrical configuration according to the recharging system of the present embodiment.

The battery pack 100 includes a rechargeable battery 30 described below (see FIG. 3). The battery 30 is, for example, a lithium-ion battery including multiple battery cells connected in series. The battery pack 100 includes a battery-side attaching portion 20 and a battery-side terminal portion 10.

The battery-side attaching portion 20 is provided on an under surface of the battery pack 100 and is configured to be attached to the high rate battery charger 200 and the low rate battery charger 300. The battery-side terminal portion 10 is provided to the battery-side attaching portion 20, and includes multiple terminals described below. The battery-side attaching portion 20 is configured to be attached to an electric powered work machine that is not shown. When the battery-side attaching portion 20 is attached to the electric powered work machine, the battery pack 100 supplies an electric power to the electric powered work machine, and the electric powered work machine is driven by the electric power received from the battery pack 100. Examples of the electric powered work machine include an electric power tool such as an impact driver and a circular saw, a gardening tool such as a grass mower and a trimmer, a laser marking device, a light, and the like.

The high rate battery charger 200 and the low rate battery charger 300 each include a power cord, and the power cord is connected to an external power supply such as a commercial power supply (or utility power or mains electric power). Each of the high rate battery charger 200 and the low rate battery charger 300 generates an electric power to supply to the battery 30 from an electric power supplied from the external power supply.

The high rate battery charger 200 charges the battery 30 with a high rate charging current. A maximum value of the high rate charging current from the high rate battery charger 200 is equal to or more than a completion current value Icut. The high rate battery charger 200 can charge the battery pack 100 with an electric current having a value equal to or more than the completion current value Icut. The completion current value Icut corresponds to a charging current value on completion of the charging when the battery 30 is charged with a constant current and a constant voltage.

The low rate battery charger 300 charges the battery 30 with a low rate charging current. A maximum value of the low rate charging current from the low rate battery charger 300 is less than the completion current value Icut. The low rate battery charger 300 cannot charge the battery pack 100 with an electric current having a value equal to or more than the completion current value Icut.

The high rate battery charger 200 includes a first charger-side attaching portion 220 and a first charger-side terminal portion 210. The first charger-side attaching portion 220 is provided on the top surface of the high rate battery charger 200. The first charger-side terminal portion 210 is provided to the first charger-side attaching portion 220. The low rate battery charger 300 includes a second charger-side attaching portion 320 and a second charger-side terminal portion 310. The second charger-side attaching portion 320 is provided on the top surface of the low rate battery charger 300. The second charger-side terminal portion 310 is provided to the first charger-side attaching portion 320.

The first charger-side attaching portion 220 has a shape that is the same shape as the second charger-side attaching portion 320. Each of the first charger-side terminal portion 210 and the second charger-side terminal portion 310 includes multiple terminals described below. Each of the multiple terminals of the first charger-side terminal portion 210 has a shape that is the same shape as the respective multiple terminals of the second charger-side terminal portion 310. The first and second charger-side attaching portions 220, 320 are configured such that the battery-side attaching portion 20 is mounted. The first charger-side terminal portion 210 is configured to be connected to the battery-side terminal portion 10 when the battery-side attaching portion 20 is attached to the first charger-side attaching portion 220. The second charger-side terminal portion 310 is configured to be connected to the battery-side terminal portion 10 when the battery-side attaching portion 20 is attached to the second charger-side attaching portion 320.

The high rate battery charger 200 has a body that is bigger than that of the low rate battery charger 300. Thus, the high rate battery charger 200 accommodates therein large, expensive components that are more excellent in properties such as heat resistance than components accommodated in the low rate battery charger 300. The high rate battery charger 200 can output an maximum current larger than a maximum current outputted from the low rate battery charger 300.

<1-2. Electrical Configurations>

Electrical configurations of the battery pack 100, the high rate battery charger 200, and the low rate battery charger 300 will be described with reference to FIG. 3. The electrical configuration of the high rate battery charger 200 is the same as that of the low rate battery charger 300.

<1-2-1. Electrical Configuration of Battery Pack>

The electrical configuration of the battery pack will be described. The battery pack 100 includes a battery 30, a battery Micro Control Unit (MCU) 50, an Analog Front End (AFE) 40, a regulator 61, an interruption device 62, a battery shunt resistor 63, a first temperature detection circuit 35, a charging control circuit 71, a discharge control circuit 72, a first detection circuit 73, a first communication circuit 74, the battery-side terminal portion 10, a first positive electrode line 18, and a first negative electrode line 19. The battery pack 100 may remove any of the battery MCU 50, the AFE 40, the regulator 61, the interruption device 62, the battery shunt resistor 63, the first temperature detection circuit 35, the charging control circuit 71, the discharge control circuit 72, the first detection circuit 73, the first communication circuit 74, the battery-side terminal portion 10, the first positive electrode line 18, and the first negative electrode line 19.

The battery-side terminal portion 10 includes a first positive terminal 11, a first negative terminal 12, a first charging terminal 13, a discharge terminal 14, a first detection terminal 15, and a first communication terminal 16. The battery-side terminal portion 10 may remove any of the first positive terminal 11, the first negative terminal 12, the first charging terminal 13, the discharge terminal 14, the first detection terminal 15, and the first communication terminal 16.

The first positive terminal 11 is connected to the positive electrode of the battery 30 through the first positive electrode line 18. The first negative terminal 12 is connected to the negative electrode of the battery 30 through the first negative electrode line 19. The first charging terminal 13 is connected to the charging control circuit 71. The discharge terminal 14 is connected to the discharge control circuit 72. The first detection terminal 15 is connected to the first detection circuit 73. The first communication terminal 16 is connected to the first communication circuit 74.

The regulator 61 is connected to the positive electrode of the battery 30, and receives an electric power from the battery 30. The regulator 61 generates an electric power (e.g., an electric power of 5V) to supply to various circuits, such as the battery MCU 50 and the AFE 40, in the battery pack 100.

The interruption device 62 is provided on the first positive electrode line 18. The interruption device 62 interrupts the conduction of the first positive electrode line 18. Examples of the interruption device 62 include a Field Effect Transistor (FET), a Self Control Protector (SCP), and the like.

The battery shunt resistor 63 is provided on the first negative electrode line 19 and detects a value of a charging current flowing into the battery 30 and a value of a discharging current flowing out from the battery 30, and outputs the detected charging and discharging current value to the AFE 40. The first temperature detection circuit 35 detects a battery temperature of the battery 30 and outputs the detected battery temperature to the battery MCU 50.

AFE 40 is an analog circuit, and is configured to execute a Serial Peripheral Interface (SPI) communication with the battery MCU 50. In accordance with a command from the battery MCU 50, the AFE 40 detects a cell voltage value of each battery cells included in the battery 30 and a battery voltage value of the battery 30. The AFE 40 also executes a cell balance processing to equalize the remaining capacities of the multiple battery cells. Furthermore, the AFE 40 converts the detected cell voltage value, the battery voltage value, an input current value, and the like into digital signals and sends each converted digital signal to the battery MCU 50. The AFE 40 also determines a state of the battery 30 based on various inputted values, and sends a charging stop signal to the charging control circuit 71 when the charging of the battery 30 should be stopped (e.g. when in an overcharged state). In response to the charging stop signal being inputted from the AFE 40, the charging control circuit 71 outputs the charging stop signal from the first charging terminal 13 to the battery charger.

The battery MCU 50 includes a microcomputer including a CPU 50a, a memory 50b, an I/O unit, and others. The battery MCU 50 is connected to the discharge control circuit 72, the first detection circuit 73, and the first communication circuit 74.

The first detection circuit 73 detects the connection or non-connection of the battery charger or an electric powered work machine to the battery pack 100 based on an electrical potential of the first detection terminal 15, and outputs a connection signal or a non-connection signal to the battery MCU 50. Even if the charger in a power-off state is connected to the battery pack 100, the electrical potential of the first detection terminal 15 is changed. Thus, the first detection circuit 73 can detect the connection of the battery charger to the battery pack 100 regardless of the on/off state of the battery charger.

The first communication circuit 74 is a Universal Asynchronous Receiver/Transmitter (UART) executing a half-duplex serial communication. The first communication circuit 74 transmits and receives data through the first communication terminal 16.

In response to the connection signal being inputted from the first detection circuit 73, the battery MCU 50 shifts from an energy saving mode to an active mode. When the battery pack 100 is connected to the charger, the battery MCU 50 executes the charging control of the battery 30. When the battery pack 100 is connected to the electric powered work machine, the battery MCU 50 executes the discharging control of the battery 30.

Specifically, the battery MCU 50 executes the charging control and the discharging control of the battery 30 based on the cell voltage, the battery voltage, and the current value received from the AFE 40 and the temperature value inputted from the first temperature detection circuit 35.

Figure 4:
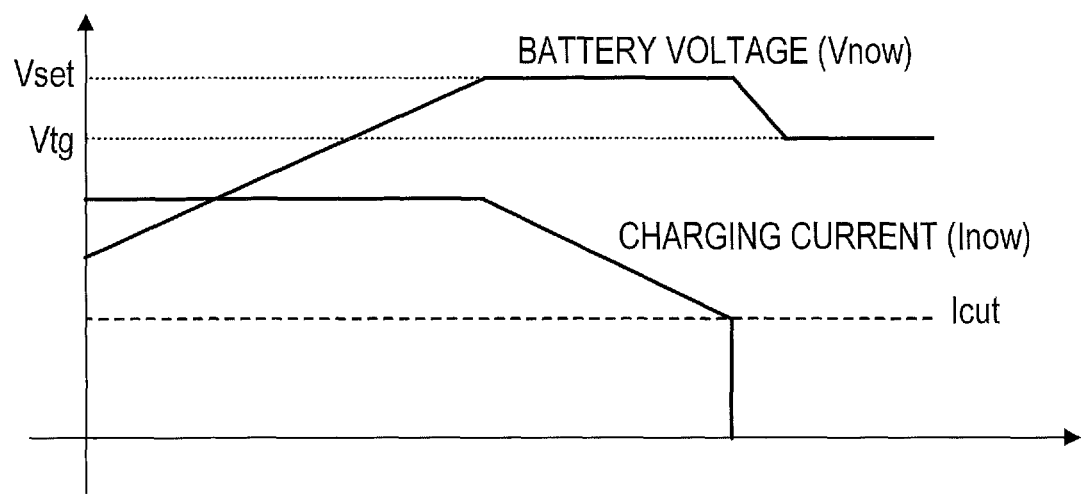
FIG. 4 shows a time variation of a battery voltage value and a charging current value when charging is completed in response to a first condition being satisfied with a battery charger whose outputtable maximum current value is equal to or more than a completion current value.

The battery MCU 50 executes a different charging control in accordance with a rate of the battery charger. As shown in FIG. 4, when the battery 30 is charged with the high rate battery charger 200, the battery MCU 50 executes a constant current constant voltage charging, and stops charging in response to a first condition being satisfied. The first condition is satisfied when (i) a battery voltage value Vnow becomes equal to or more than a completion voltage value Vset and (ii) a next current value Inext becomes less than a completion current value Icut.

When the battery 30 is charged with the high rate battery charger 200, the battery 30 is charged with the constant charging current value Inow that is larger than the completion current value Icut, and the battery voltage value Vnow reaches the completion voltage value Vset. In response to the battery voltage value Vnow reaching the completion voltage value Vset, the charging current value Inow decreases so that the battery voltage value Vnow remains constant at the completion voltage value Vset. Then, in response to the next current value Inext being less than the completion current value Icut, the charging stops. The next current value Inext is a value calculated based on the charging current value Inow in the present processing cycle and corresponds to an allowable value of the charging current value in the next processing cycle. Also, an open circuit voltage value on completion of the charging with the high rate battery charger 200 corresponds to a target voltage value Vtg to be aimed for.

Figure 5:
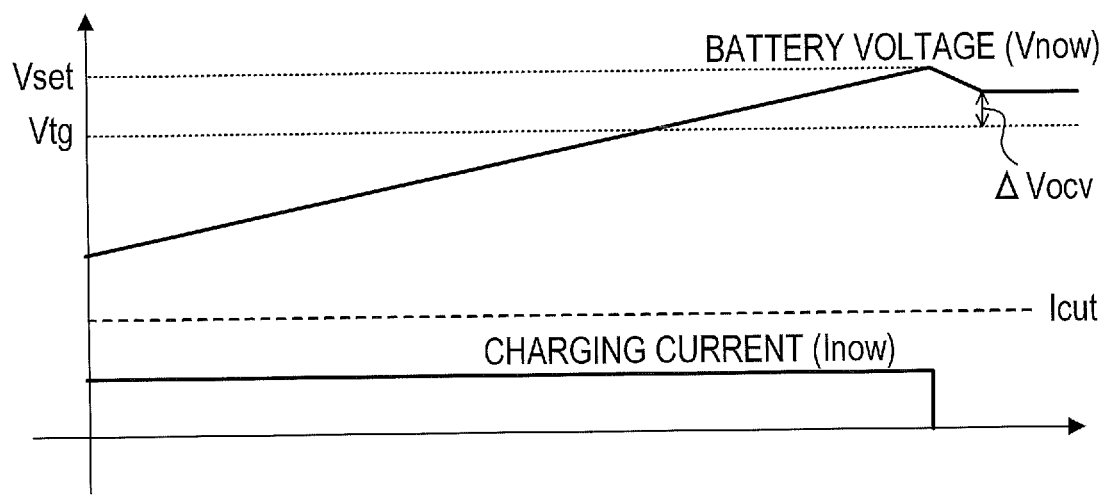
FIG. 5 shows a time variation of a battery voltage value and a charging current value when charging is completed in response to the first condition being satisfied with a battery charger whose outputtable maximum current value is less than the completion current value.

Here, as shown in FIG. 5, suppose that the charging is stopped in response to the first condition being satisfied when the battery 30 is charged with the low rate battery charger 300. The charging current value Inow of the low rate battery charger 300 is smaller than the completion current value Icut. Since the charging current value Inow is smaller than the completion current value Icut from the start of the charging, the charging stops in response to the battery voltage value Vnow reaching the completion voltage value Vset. An open circuit voltage value on completion of the charging is larger than the target voltage value Vtg. That is, when the battery 30 is charged with the low rate battery charger 300 and the charging stops in response to the first condition being satisfied, the charging capacity of the battery 30 increases compared to the case where the battery 30 is charged with the high rate battery charger 200.

The open circuit voltage value on completion of the charging corresponds to a value obtained by subtracting an amount of a voltage drop due to the internal resistance of the battery 30 from the battery voltage value Vnow on completion of the charging. The charging current value Inow when the battery 30 is charged with the low rate battery charger 300 is smaller than the charging current value Inow when the battery 30 is charged with the high rate battery charger 200. Thus, if the battery 30 is charged with the low rate battery charger 300, the amount of voltage drop due to the internal resistance of the battery 30 is small compared to a case where the battery 30 is charged with the high rate battery charger 200. Thus, if the battery 30 is charged with the low rate battery charger 300 and the charging stops in response to the battery voltage value Vnow becoming equal to or more than the completion voltage value Vset, the open circuit voltage value on completion of the charging is the target voltage value Vtg+ΔVocv. The ΔVocv corresponds to the difference between the amount of voltage drop when the battery 30 is charged with the high rate battery charger 200 and the amount of voltage drop when the battery 30 is charged with the low rate battery charger 300.

Figure 6:
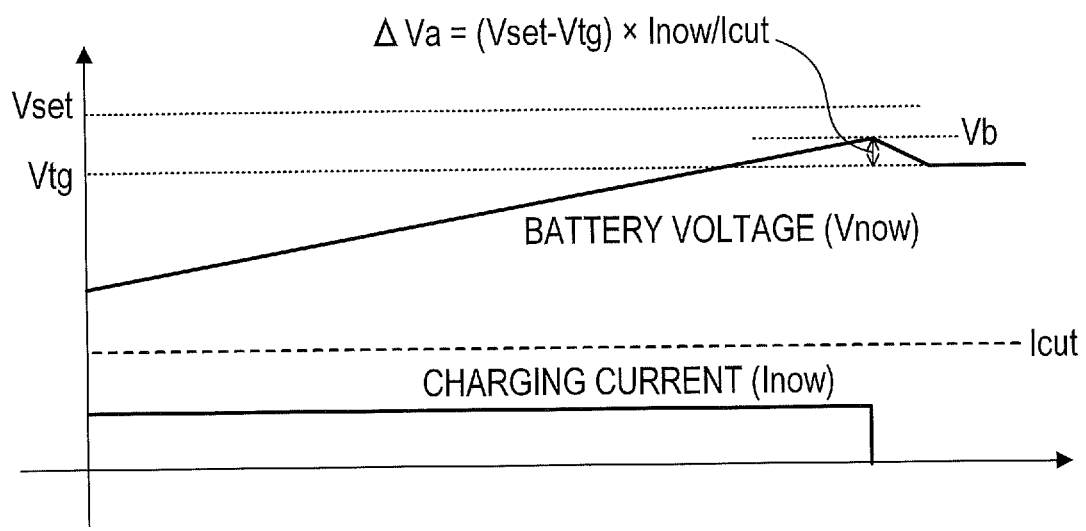
FIG. 6 shows a time variation of a battery voltage value and a charging current value when charging is completed in response to a second condition being satisfied with a battery charger whose outputtable maximum current value is less than the completion current value.

Thus, when the battery 30 is charged with the low rate battery charger 300, the battery MCU 50 stops charging in response to a second condition that is different from the first condition being satisfied. As shown in FIG. 6, the second condition is set so that the open circuit voltage value on completion of the charging by the low rate battery charger 300 is matched to the target voltage value Vtg.

Specifically, the battery MCU 50 stops charging in response to the battery voltage value Vnow being equal to or more than a determination value Vb. The determination value Vb is a value obtained by adding a correction value ΔVa to the target voltage value Vtg. The correction value ΔVa corresponds to an amount of the voltage drop when the battery 30 is charged with the low rate battery charger 300 using an electric current of the charging current value Inow, and the correction value ΔVa is represented by a formula ΔVa=(Vset−Vtg)×Inow/Icut. The open circuit voltage value and the charging capacity on completion of the charging of the battery 30 with the low rate battery charger 300 are thereby matched to the open circuit voltage value and the charging capacity on completion of the charging of the battery 30 with the high rate battery charger 200.

When the battery MCU 50 determines that an electric powered work machine is connected to the battery pack 100 and the battery 30 is in a state of being unable to discharge electric power (e.g., in an over-discharged state or in an over-heated state), the battery MCU 50 outputs a discharge prohibition signal to the discharge control circuit 72. The discharge prohibition signal prohibits the electric discharge from the battery 30. The discharge control circuit 72 outputs the discharge prohibition signal, which is inputted from the battery MCU 50, from the discharge terminal 14 to the electric powered work machine. When determining that the battery 30 is in a state of being able to discharge electric power, the battery MCU 50 outputs a watchdog pulse signal (a pulse signal at constant intervals) to the discharge control circuit 72. When the watchdog pulse signal is not inputted, the discharge control circuit 72 outputs the discharge prohibition signal from the discharge terminal 14 to the electric powered work machine.

In addition, when the battery MCU 50 outputs the discharge prohibition signal to the electric powered work machine but the electric discharge is not stopped, the battery MCU 50 controls the interruption device 62 to interrupt the conduction of the first positive electrode line 18. For example, when the interruption device 62 is FET, the battery MCU 50 turns off the FET. When the interruption device 62 is SCP, the battery MCU 50 blows a fuse of the SCP.

The battery MCU 50 is shut down upon reaching the over-discharged state. In response to the battery pack 100 being connected to the charger while the battery MCU 50 is shut down, auxiliary power is supplied from the battery charger through the discharge terminal 14. The regulator 61 receives the auxiliary power through the discharge terminal 14 and generates power to supply the power to the battery MCU 50. Upon receipt of the power from the regulator 61, the battery MCU 50 wakes up from the shutdown state.

<1-2-2. Electrical Configuration of Battery Charger>

The high rate battery charger 200 and the low rate battery charger 300 include a battery charger MCU 400, a switching power supply circuit 410, an FET 420, an interlock circuit 430, a second temperature detection circuit 440, a battery charger shunt resistor 450, a second detection circuit 460, a second communication circuit 470, the first and second charge-side terminal portions 210, 310, a second positive electrode line 480, and a second negative electrode line 490. The high rate battery charger 200 and/or the low rate battery charger 300 may remove any of the battery charger MCU 400, the switching power supply circuit 410, the FET 420, the interlock circuit 430, the second temperature detection circuit 440, the battery charger shunt resistor 450, the second detection circuit 460, the second communication circuit 470, the first and second charge-side terminal portions 210, 310, the second positive electrode line 480, and the second negative electrode line 490.

The first and second charger-side terminal portions 210, 310 include a second positive terminal 411, a second negative terminal 412, a second charging terminal 413, a power source terminal 414, a second detection terminal 415 and a second communication terminal 416. The first charger-side terminal portion 210 and/or the second charger-side terminal portion 310 may remove any of the second positive terminal 411, the second negative terminal 412, the second charging terminal 413, the power source terminal 414, the second detection terminal 415, and the second communication terminal 416.

The second positive terminal 411 is configured to be connected to the first positive terminal 11. The second negative terminal 412 is configured to be connected to the first negative terminal 12. The second charging terminal 413 is configured to be connected to the first charging terminal 13. The power source terminal 414 is configured to be connected to the discharge terminal 14. The second detection terminal 415 is configured to be connected to the first detection terminal 15. The second communication terminal 416 is configured to be connected to the first communication terminal 16.

The switching power supply circuit 410 is connected to the second positive terminal 411 through the second positive electrode line 480 and is connected to the second negative terminal 412 through the second negative electrode line 490. The switching power supply circuit 410 operates in accordance with a control command from the battery charger MCU 400, and outputs a charging current.

The FET 420 is provided to the second positive electrode line 480. The battery charger shunt resistor 450 is provided to the second negative electrode line 490. The battery charger shunt resistor 450 detects a value of the charging current flowing out from the switching power supply circuit 410 to the battery pack 100, and outputs the detected value to the battery charger MCU 400. The second temperature detection circuit 44 detects a temperature of the switching power supply circuit 410 (hereinafter, referred to as a battery charger temperature), and outputs the detected value of the battery charger temperature to the battery charger MCU 400.

The interlock circuit 430 is connected to the second charging terminal 413, and stops the operation of the switching power supply circuit 410 when the charging stop signal is inputted through the second charging terminal 413.

The battery charger MCU 400 includes a microcomputer provided with a CPU 400a, a memory 400b, an I/O unit, and the like. The battery charger MCU 400 is connected to the second detection circuit 460 and the second communication circuit 470.

The second detection circuit 460 detects the connection or non-connection of the battery pack 100 to the battery charger based on an electrical potential of the second detection terminal 415, and outputs a connection signal or a non-connection signal to the battery charger MCU 400.

The second communication circuit 470 is a Universal Asynchronous Receiver/Transmitter (UART) executing a half-duplex serial communication. The second communication circuit 470 transmits and receives data through the second communication terminal 416.

The battery charger MCU 400 executes a charging control of battery 30. When the interlock circuit 430 cannot stop the operation of the switching power supply circuit 410, the battery charger MCU 400 turns off the FET 420. As a result, the supply of electric power from the switching power supply circuit 410 to the battery pack 100 stops.

2. Process

Figure 7:
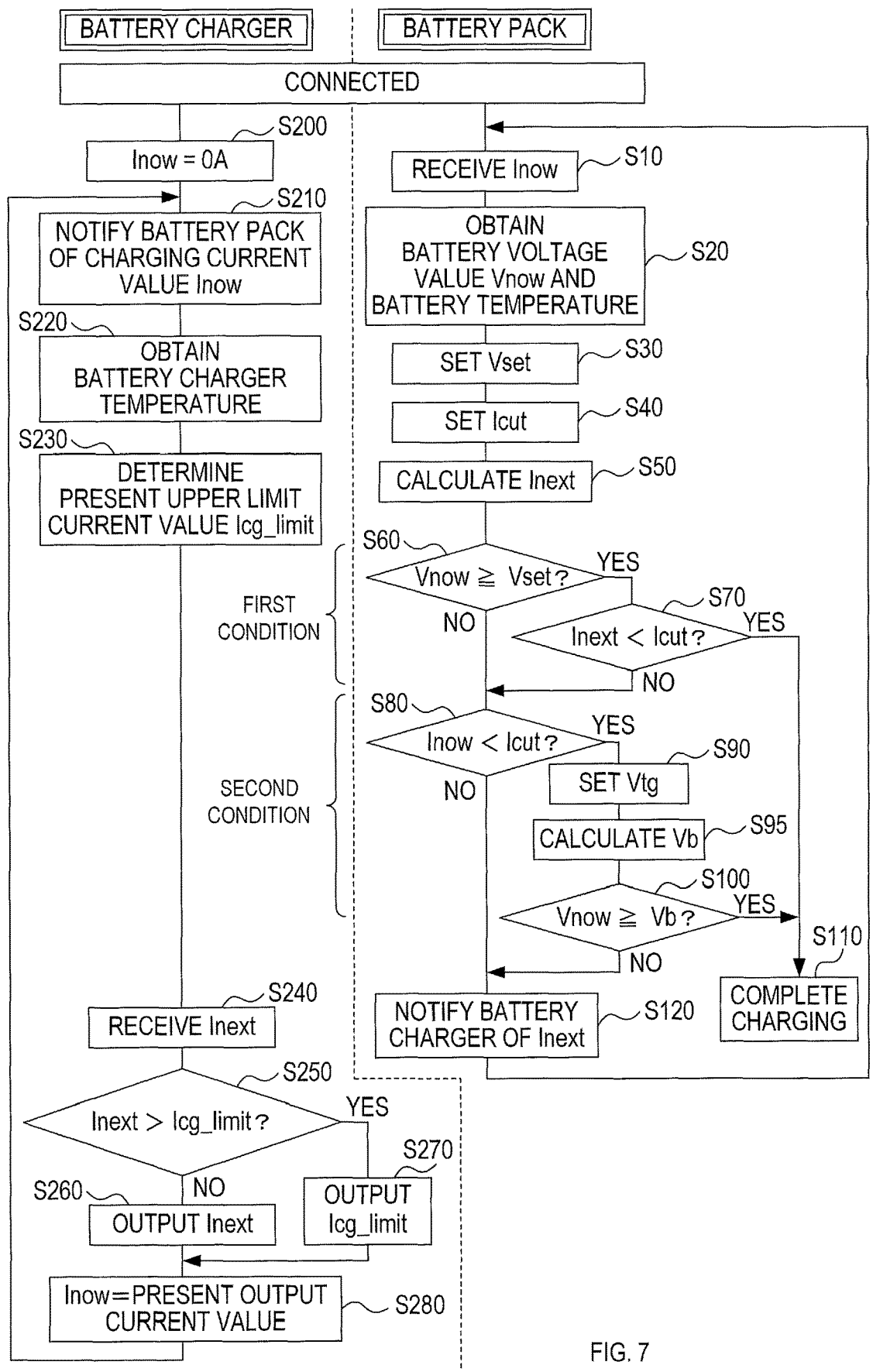
FIG. 7 is a flow chart showing a charge control process that the battery pack and the high rate battery charger or the low rate battery charger execute.

Next, the charging control that the battery MCU 50 and the battery charger MCU 400 execute will be described with reference to the flowchart of FIG. 7. The battery MCU 50 and the battery charger MCU 400 start the process in response to the battery-side attaching portion 20 being attached to the charger-side attaching portion 220 or the charger-side attaching portion 320.

First, in S200, the battery charger MCU 400 sets an initial value of the charging current value Inow to 0 (zero) A.

In S210, the battery charger MCU 400 notifies the battery pack 100 of the charging current value Inow in the present processing cycle.

In S220, the battery charger MCU 400 obtains the battery charger temperature.

In S230, battery charger MCU 400 determines a present upper limit current value Icg_limit in accordance with the battery charger temperature obtained in S220. The upper limit current value Icg_limit is an upper limit of the next current value Inext. For example, when the battery charger temperature exceeds a threshold value, the battery charger MCU 400 reduces the upper limit current value Icg_limit so that the high rate battery charger 200 or the low rate battery charger 300 do not reach an overheated state.

In S10, the battery MCU 50 receives the charging current value Inow from the battery charger attached to the battery pack 100.

In S20, the battery MCU 50 obtains a battery voltage value Vnow and a battery temperature in the present processing cycle.

Then, in S30, the battery MCU 50 sets a completion voltage value Vset in accordance with a state of the battery 30. Specifically, the battery MCU 50 sets the completion voltage value Vset in accordance with a degree of deterioration and/or the battery temperature of the battery 30. For example, the MCU 50 may set the completion voltage value Vset based on a first table. The first table shows a correlation of the degree of deterioration and/or the battery temperature and the completion voltage value Vset. The first table may be stored in the memory 50b.

In S40, the battery MCU 50 sets a completion current value Icut in accordance with the state of the battery 30. Specifically, the battery MCU 50 sets the completion current value Icut in accordance with the degree of deterioration and/or the battery temperature of the battery 30. For example, the battery MCU 50 may set the completion current value Icut based on a second table. The second table shows a correlation of the degree of deterioration and/or the battery temperature and the completion current value Icut. The second table may be stored in the memory 50b. The degree of deterioration of the battery 30 is updated every time when the battery pack 100 is used, and is stored in the memory 50b.

In S50, the battery MCU 50 calculates a next current value Inext based on the charging current value Inow. Specifically, the battery MCU 50 compares the battery voltage value Vnow with the completion voltage value Vset. Based on the comparison result, the battery MCU 50 determines whether (i) to continue to use the charging current value Inow as a next current value Inext, or (ii) to use a value obtained by decreasing or increasing the charging current value Inow as a next current value Inext. Then, the battery MCU 50 calculates the charging current value Inow or the value obtained by decreasing or increasing the charging current value Inow as the next current value Inext.

In S60 and S70, the battery MCU 50 determines whether the first condition is satisfied. Specifically, in S60, the battery MCU 50 determines whether the battery voltage value Vnow is equal to or more than the completion voltage value Vset. If the battery MCU 50 determines that the battery voltage value Vnow is equal to or more than the completion voltage value Vset (S60: YES), the process proceeds to S70. If the battery MCU 50 determines that the battery voltage value Vnow is less than the completion voltage value Vset (S60: NO), the process proceeds to S80.

In S70, the battery MCU 50 determines whether the next current value Inext is less than the completion current value Icut. If the battery MCU 50 determines that the next current value Inext is less than the completion current value Icut (S70: YES), the process proceeds to S110. In S110, the battery MCU 50 completes the charging in response to the first condition being satisfied. If the battery MCU 50 determines that the next current value Inext is equal to or more than the completion current value Icut (S70: NO), the process proceeds to S80.

In S80 to S100, the battery MCU 50 determines whether a second condition is satisfied. Specifically, in S80, the battery MCU 50 determines whether the charging current value Inow is less than the completion current value Icut. If the battery MCU 50 determines that the charging current value Inow is less than the completion current value Icut (S80: YES), the process proceeds to S90. If the battery MCU 50 determines that the charging current value Inow is equal to or more than the completion current value Icut (S80: NO), the process proceeds to S120. In S120, the battery MCU 50 continues the charging control since the first condition and the second condition are not satisfied.

In S90, the battery MCU 50 sets a target voltage value Vtg. Specifically, the battery MCU 50 calculates the target voltage value Vtg in accordance with a degree of deterioration and/or a battery temperature of the battery 30. The battery MCU 50 reduces the target voltage value Vtg in accordance with the increase of the degree of deterioration. When the battery temperature is lower or higher than a proper range, the battery MCU 50 reduces the target voltage value Vtg compared to a case where the battery temperature is within the proper range. For example, the battery MCU 50 calculates the target voltage value Vtg based on a third table. The third table shows the target voltage values Vtg associated with the degree of deterioration and the battery temperature. FIG. 8 shows an example of the third table. The third table may be stored in the memory 50b. The target voltage value Vtg calculated here corresponds to an open circuit voltage value of the battery 30 on completion of the charging of the battery 30 in response to the first condition being satisfied.

In S95, the battery MCU 50 calculates a correction value ΔVa. Furthermore, the battery MCU 50 calculates a determination value Vb by adding the correction value ΔVa to the target voltage value Vtg calculated in S90.

In S100, the battery MCU 50 determines whether the battery voltage value Vnow is equal to or more than the determination value Vb.

If the battery MCU 50 determines that the battery voltage value Vnow is equal to or more than the determination value Vb (S100: YES), the process proceeds to S110. In S110, the battery MCU 50 completes the charging in response to the second condition being satisfied. If the battery MCU 50 determines that the battery voltage value Vnow is less than the determination value Vb (S100: NO), the process proceeds to S120. In S120, the battery MCU 50 continues the charging control since the first condition and the second condition are not satisfied.

Here, the determination value Vb is less than the completion voltage value Vset. Therefore, when the charging current value Inow is less than the completion current value Icut, the second condition is satisfied before the first condition is satisfied, and the charging is stopped. On the other hand, when the charging current value Inow is equal to or more than the completion current value Icut, the battery MCU 50 does not determine whether the second condition is satisfied, and only determines whether the first condition is satisfied. In this case, in response to the first condition being satisfied, the charging is stopped.

In S120, the battery MCU 50 transmits the next current value Inext calculated in S50 to the battery charger connected to the battery pack 100. Then, the process returns to S10, and the next processing cycle is started. The battery MCU 50 executes the processes of S10 to S120 repeatedly until the charging is completed.

On the other hand, in S240, the battery charger MCU 400 receives the next current value Inext transmitted from the battery pack 100.

In S250, the battery charger MCU 400 determines whether the received next current value Inext is more than the upper limit current value Icg_limit determined in S230. If the battery charger MCU 400 determines that the next current value Inext is equal to or less than the upper limit current value Icg_limit (S250: NO), the process proceeds to S260. If the battery charger MCU 400 determines that the next current value Inext is more than the upper limit current value Icg_limit (S250: YES), the process proceeds to S270.

In S260, the battery charger MCU 400 outputs a control command to the switching power circuit 410 so that an electric current having the next current value Inext is outputted to the battery pack 100, and the process proceeds to S280.

In S270, the battery charger MCU 400 outputs a control command to the switching power circuit 410 so that an electric current having the upper limit current value Icg_limit is outputted to the battery pack 100, and the process proceeds to S280.

In S280, the battery charger MCU 400 sets a present output current value to the charging current value Inow. Then the process returns to S210, and the battery charger MCU 400 starts a next processing cycle. The battery charger MCU 400 executes the processes of S210 to S280 repeatedly, and completes the charging process in response to the next current value Inext being 0.

3. Effect

According to this embodiment described above, the following effects can be obtained.

(1) When the charging current value Inow is equal to or more than the completion current value Icut, the charging is stopped in response to the first condition being satisfied. When the charging current value Inow is less than the completion current value Icut, the charging is stopped in response to the second condition different from the first condition being satisfied. That is, when the battery is charged with a relatively small charging current value Inow, a charging control, which is different from the one used when the battery is charged with a relatively large charging current value Inow, is executed. Thus, the battery pack 100 is applicable to both the high rate battery charger 200 and the low rate battery charger 300.

(2) When the battery 30 is charged with the electric current having the relatively small charging current value Inow, the second condition is set so that the open circuit voltage value on completion of the charging is matched to the target voltage value Vtg. This allows the open circuit voltage value on completion of the charging when the battery 30 is charged with the electric current having the relatively small charging current value Inow to be matched to the open circuit voltage value on completion of the charging when the battery 30 is charged with the electric current having the relatively large charging current value Inow.

(3) The target voltage value Vtg is calculated based on the state of the battery 30, which can inhibit the overcharge of the battery 30 and can suitably protect the battery 30.

(4) The amount of the voltage drop with the charging current value Inow is calculated as the correction value ΔVa, and a value obtained by adding the correction value ΔVa to the target voltage value Vtg is calculated as the determination value Vb. This allows the open circuit voltage value on completion of the charging in response to the second condition being satisfied to be matched to the target voltage value Vtg.

Other Embodiments

Although the embodiments for carrying out the present disclosure have been described above, the present disclosure is not limited to the above-described embodiments, and various modifications can be made.

(a) In place of or in addition to the microcomputer, the battery MCU 50 may be provided with a combination of various electronic components, Application Specified Integrated Circuit (ASIC), Application Specific Standard Product (ASSP), a programable logic device such as Field Programmable Gate Array (FPGA), and a combination thereof.

(b) A plurality of functions of one element of the aforementioned embodiments may be performed by a plurality of elements, and one function of one element may be performed by a plurality of elements. Furthermore, a plurality of functions of a plurality of elements may be performed by one element, and one function performed by a plurality of elements may be performed by one element. Furthermore, a part of the configurations of the aforementioned embodiments may be omitted. Still further, at least a part of the configurations of the aforementioned embodiments may be added to or replaced with the configurations of the other above-described embodiments.

What is claimed is:

1. A method for controlling a charging of a battery electrically connected to a battery charger, the method comprising:

detecting a voltage value of the battery;

obtaining a charging current value, the charging current value corresponding to a magnitude of a charging current flowing from the battery charger to the battery in a present processing cycle;

calculating a next current value based on the charging current value obtained, the next current value corresponding to an allowable value of the charging current value in a next processing cycle, stopping the charging of the battery in response to (i) the charging current value obtained being equal to or more than a completion current value that is set and (ii) a first condition being satisfied, the first condition being satisfied in response to (i) the voltage value detected being equal to or more than a completion voltage value that is set and (ii) the next current value calculated being less than the completion current value; and stopping the charging of the battery in response to (i) the charging current value obtained being less than the completion current value and (ii) a second condition different from the first condition being satisfied.

2. A battery pack comprising:

an attaching portion configured to be electrically and mechanically connected to a battery charger;

a battery electrically connected to the attaching portion;

a voltage detection circuit configured to detect a voltage value of the battery;

a current acquisition circuit configured to obtain a charging current value, the charging current value corresponding to a magnitude of a charging current flowing from the battery charger to the battery in a present processing cycle;

a next current calculation circuit configured to calculate a next current value based on the charging current value obtained by the current acquisition circuit, the next current value corresponding to an allowable value of the charging current value in a next processing cycle;

a first charging stop circuit configured to stop a charging of the battery in response to (i) the charging current value obtained by the current acquisition circuit being equal to or more than a completion current value that is set and (ii) a first condition being satisfied, the first condition being satisfied in response to (i) the voltage value detected by the voltage detection circuit being equal to or more than a completion voltage value that is set, and that (ii) the next current value calculated by the next current calculation circuit being less than the completion current value; and a second charging stop circuit configured to stop the charging of the battery in response to (i) the charging current value obtained by the current acquisition circuit being less than the completion current value and (ii) a second condition different from the first condition being satisfied.

3. The battery pack according to claim 2, further comprising:

a target voltage setting circuit configured to set a target voltage value, wherein the target voltage value corresponds to an open circuit voltage value of the battery in response to a charging of the battery being stopped by the first charging stop circuit, and wherein the second condition corresponds to a condition that an open circuit voltage value of the battery in response to the charging being stopped by the second charging stop circuit is matched to the target voltage value.

4. The battery pack according to claim 3, further comprising:

a temperature detection circuit configured to detect a temperature of the battery, wherein the target voltage setting circuit is configured to set the target voltage value based on the temperature detected by the temperature detection circuit and/or a degree of deterioration of the battery.

5. The battery pack according to claim 4, further comprising:

a memory storing a correlation data of the temperature and/or the degree of deterioration of the battery and the target voltage value, wherein the target voltage setting circuit is configured to set the target voltage value based on the correlation data stored in the memory.

6. The battery pack according to claim 3, further comprising:
a determination value calculation circuit configured to calculate a determination value by adding a correction value to the target voltage value,
wherein the correction value corresponds to (Vset−Vtg)× Inow/Icut,
wherein Vset represents the completion voltage value, Vtg represents the target voltage value, Inow represents the charging current value obtained by the current acquisition circuit, and Icut represents the completion current value, and
wherein the second condition is satisfied in response to the voltage value detected by the voltage detection circuit being equal to or more than the determination value calculated by the determination value calculation circuit.

7. The battery pack according to claim 4, further comprising:
a completion electric current setting circuit configured to set the completion current value based on the temperature detected by the temperature detection circuit and/or the degree of deterioration of the battery.

8. The battery pack according to claim 4, further comprising:
a completion voltage setting circuit configured to set the completion voltage value based on the temperature detected by the temperature detection circuit and/or the degree of deterioration of the battery.

9. The battery pack according to claim 2, further comprising:
a communication circuit configured to communicate with the battery charger,
wherein the current acquisition circuit is configured to obtain the charging current value from the battery charger through the communication circuit.

10. The battery pack according to claim 9,
wherein the next current calculation circuit is configured to transmit the next current value calculated to the battery charger through the communication circuit.

11. A battery pack comprising:
a battery-side attaching portion configured to be electrically and mechanically attached to a battery charger;
a battery electrically connected to the battery-side attaching portion;
an analog front end configured to detect a voltage value of the battery;
a first temperature detection circuit configured to detect a temperature of the battery;
a first communication circuit configured to communicate with the battery charger attached to the battery-side attaching portion; and
a battery micro control unit programmed to execute:
a first function to obtain a charging current value through the first communication circuit, the charging current value corresponding to a magnitude of a charging current flowing from the battery charger to the battery in a present processing cycle;
a second function to set a completion voltage value and a completion current value based on the temperature detected by the first temperature detection circuit and/or a degree of deterioration of the battery;
a third function to calculate a next current value based on the charging current value obtained, the next current value corresponding to an allowable value of the charging current value in a next processing cycle;
a fourth function to set a target voltage value based on the temperature detected by the first temperature detection circuit and/or the degree of deterioration of the battery;
a fifth function to add a correction value to the target voltage value to thereby calculate a determination value;
a sixth function to stop a charging of the battery in response to (i) the charging current value obtained being equal to or more than the completion current value that is set and (ii) a first condition being satisfied, the first condition being satisfied in response to (i) the voltage value detected by the analog front end being equal to or more than the completion voltage value that is set, and that (ii) the next current value calculated being less than the completion current value that is set; and
a seventh function to stop the charging of the battery in response to (i) the charging current value obtained being less than the completion current value that is set and (ii) a second condition different from the first condition being satisfied, the second condition being satisfied in response to the voltage value detected by the analog front end being equal to or more than the determination value calculated.

* * * * *